(12) United States Patent
Matson et al.

(10) Patent No.: US 10,190,288 B2
(45) Date of Patent: Jan. 29, 2019

(54) EXCAVATION MEASUREMENT WITH LIGHT CURTAIN

(71) Applicant: Ace/Avant Concrete Construction Co., Inc., Archdale, NC (US)

(72) Inventors: Malachi D. Matson, Archdale, NC (US); Jonathan L. Matson, Archdale, NC (US); Jones Ahoi, Archdale, NC (US); William G. Arpin, Archdale, NC (US)

(73) Assignee: Ace/Avant Concrete Construction Co., Inc., Archdale, NC (US)

( * ) Notice: Subject to any disclaimer, the term of this patent is extended or adjusted under 35 U.S.C. 154(b) by 0 days.

(21) Appl. No.: 15/478,938

(22) Filed: Apr. 4, 2017

(65) Prior Publication Data

US 2017/0292248 A1    Oct. 12, 2017

Related U.S. Application Data

(60) Provisional application No. 62/319,992, filed on Apr. 8, 2016.

(51) Int. Cl.
*E02F 9/26*     (2006.01)
*G01B 11/22*    (2006.01)
(Continued)

(52) U.S. Cl.
CPC .............. *E02F 9/261* (2013.01); *E02F 9/205* (2013.01); *E02F 9/2054* (2013.01); *E02F 9/262* (2013.01);
(Continued)

(58) Field of Classification Search
CPC ..... E02F 5/14; E02F 5/145; E02F 9/26; E02F 9/261; E02F 9/262; E02F 9/264; E02F 9/265; G01C 3/00; G01C 3/02; G01C 3/06; G01C 3/08; G01C 3/20; G01C 5/00; G01C 5/02; G01C 7/00; G01C 7/02; G01C 7/04; G01C 7/06; G01C 9/00; G01C 9/02; G01C 2009/066; G01C 15/00; G01C 15/002; G01C 15/004; G01C 15/006; G01C 15/008; G01C 15/10; G01C 15/105; G01B 11/02; G01B 11/026; G01B 11/04; G01B 11/043;
(Continued)

(56) References Cited

U.S. PATENT DOCUMENTS 4,149,251 A    4/1979  Noordermeer et al.
4,374,420 A    2/1983  Wolters
(Continued)

FOREIGN PATENT DOCUMENTS

| JP | 2016008484 | | 1/2016 | |
|---|---|---|---|---|
| SU | 1765318 A1 | * | 9/1992 | |
| WO | WO 2016001481 A1 | * | 1/2016 | ............. B66C 13/48 |

OTHER PUBLICATIONS

International Search Report and Written Opinion for PCT/US2017/025967 dated Jun. 28, 2017 (13 pages).

*Primary Examiner* — Gordon J Stock, Jr.
(74) *Attorney, Agent, or Firm* — Dicke, Billig & Czaja, PLLC

(57) ABSTRACT

An excavation measurement system includes a sensor to be mounted on excavation equipment to establish a light curtain in an excavation area, the light curtain to measure a parameter of the excavation area, and an interface to communicate the measure of the parameter of the excavation area.

44 Claims, 16 Drawing Sheets

(51) Int. Cl.
- *G01B 11/28* (2006.01)
- *G01C 7/02* (2006.01)
- *G01C 3/00* (2006.01)
- *E02F 9/20* (2006.01)
- *G01C 9/06* (2006.01)
- *G01B 11/02* (2006.01)
- *G01B 11/25* (2006.01)
- *G01C 5/00* (2006.01)

(52) U.S. Cl.
CPC .............. *E02F 9/264* (2013.01); *G01B 11/02* (2013.01); *G01B 11/22* (2013.01); *G01B 11/2518* (2013.01); *G01B 11/285* (2013.01); *G01C 3/00* (2013.01); *G01C 5/00* (2013.01); *G01C 7/02* (2013.01); *G01C 9/06* (2013.01); *G01C 2009/066* (2013.01)

(58) Field of Classification Search
CPC ....... G01B 11/046; G01B 11/14; G01B 11/22; G01B 11/24; G01B 11/25; G01B 11/2518; G01B 11/28; G01B 11/285; G01B 11/30; G01B 11/303; G01B 11/306
USPC ....... 356/601–613, 625, 626, 627, 628, 629, 356/634, 635
See application file for complete search history.

(56) References Cited

U.S. PATENT DOCUMENTS

| | | | |
|---|---|---|---|
| 4,633,383 A | 12/1986 | Omachi et al. | |
| 4,868,752 A * | 9/1989 | Fujii | G05D 1/0246 348/120 |
| 5,528,498 A | 6/1996 | Scholl | |
| 6,085,583 A * | 7/2000 | Cannon | E02F 3/435 37/413 |
| 6,363,632 B1 * | 4/2002 | Stentz | E02F 3/437 37/348 |
| 6,389,785 B1 * | 5/2002 | Diekhans | A01B 69/001 172/4.5 |
| 6,415,604 B1 | 7/2002 | Motomura et al. | |
| 6,661,524 B2 * | 12/2003 | Smith | F41H 11/24 356/3.01 |
| 6,691,437 B1 | 2/2004 | Yost et al. | |
| 6,736,216 B2 | 5/2004 | Savard et al. | |
| 7,113,105 B2 | 9/2006 | Sahm et al. | |
| 7,150,115 B2 | 9/2006 | Sahm et al. | |
| 7,516,563 B2 | 4/2009 | Koch | |
| 8,140,997 B2 * | 3/2012 | Nemoto | G06F 3/048 715/795 |
| 8,363,210 B2 | 1/2013 | Montgomery | |
| 8,817,238 B2 | 8/2014 | Montgomery | |
| 2006/0090379 A1 | 5/2006 | Furem | |
| 2006/0265914 A1 * | 11/2006 | Gudat | E02F 9/245 37/348 |
| 2010/0245542 A1 * | 9/2010 | Kim | G01B 11/00 348/46 |
| 2011/0311342 A1 | 12/2011 | Montgomery | |
| 2014/0100712 A1 * | 4/2014 | Nomura | E02F 3/32 701/1 |
| 2014/0285690 A1 * | 9/2014 | Benedetti | G06T 3/00 348/241 |
| 2015/0094953 A1 | 4/2015 | Montgomery | |
| 2015/0361642 A1 | 12/2015 | Stratton | |
| 2016/0076228 A1 | 3/2016 | Nau | |
| 2017/0118915 A1 * | 5/2017 | Middelberg | A01B 69/008 |

* cited by examiner

EXCAVATION MEASUREMENT WITH LIGHT CURTAIN

CROSS-REFERENCE TO RELATED APPLICATIONS

This application claims priority under 35 U.S.C. § 119(e) to U.S. Provisional Patent Application Ser. No. 62/319,992, filed on Apr. 8, 2016, and incorporated herein by reference.

FIELD OF THE INVENTION

The present invention relates generally to excavation measurement and, more specifically, to detecting and measuring physical features of an excavation site.

BACKGROUND OF THE INVENTION

During an earthmoving or excavation process, measurements of dimensions or other parameters of an excavation are often estimated based on a comparison of a ground engaging tool to the excavation (e.g., comparing a dimension of an excavator bucket to the excavation) and/or performed by hand, during which an individual may have to enter the excavation to perform the measurement. Estimations of such measurements, however, are prone to error, inefficient, and may consume additional resources (e.g., material and time in refilling an over-excavated excavation). In addition, performing such measurements by hand is inefficient, time consuming, and potentially unsafe.

DETAILED DESCRIPTION

The present disclosure provides a system and method for detecting and measuring topography, dimensions or other parameters (including changes or variations thereof) of an excavation, including, for example, width, length, height (depth), slope (grade), including side slope and/or longitudinal slope, profile, and/or elevation of an excavation area.

In one embodiment, the system and method uses a non-invasive laser sensor/scanner to dimensionally measure site topography of an excavation, including before, during, and/or after excavation. Information or data of the measurement may include, for example, width, length, height (depth), slope (grade), including side slope and/or longitudinal slope, profile, and/or elevation (including changes or variations thereof) of an excavation, such as, for example, a hole, pit, trench, channel, trough, cut, ditch, cavity, shaft, tunnel, burrow, mine, hollow, quarry, dig, etc. In one implementation, the measurement data is displayed in real-time (or near real-time) to an operator of excavation or earthmoving equipment used to perform the excavation. As such, the operator may operate the excavation or earthmoving equipment (e.g., make adjustments to and/or with a ground engaging tool thereof) to achieve a desired dimension or other parameter (including changes or variations thereof) of the excavation. In one implementation, the measurement data may be used in conjunction with other data and/or may be communicated remotely (e.g., via cellular, Wi-Fi, or other means of communication) to enable remote monitoring and documentation of the excavation process, such as the progress, efficiency, and/or quality of the excavation.

Figure 1:
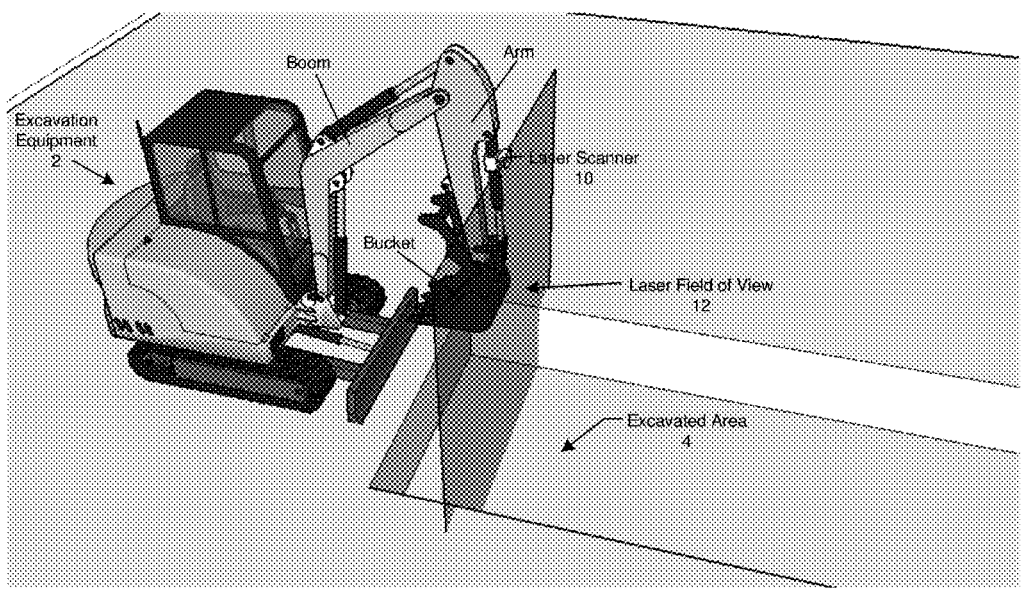
FIGS. 1 and 2 illustrate an example of an excavation measurement system and method.
Figure 2:
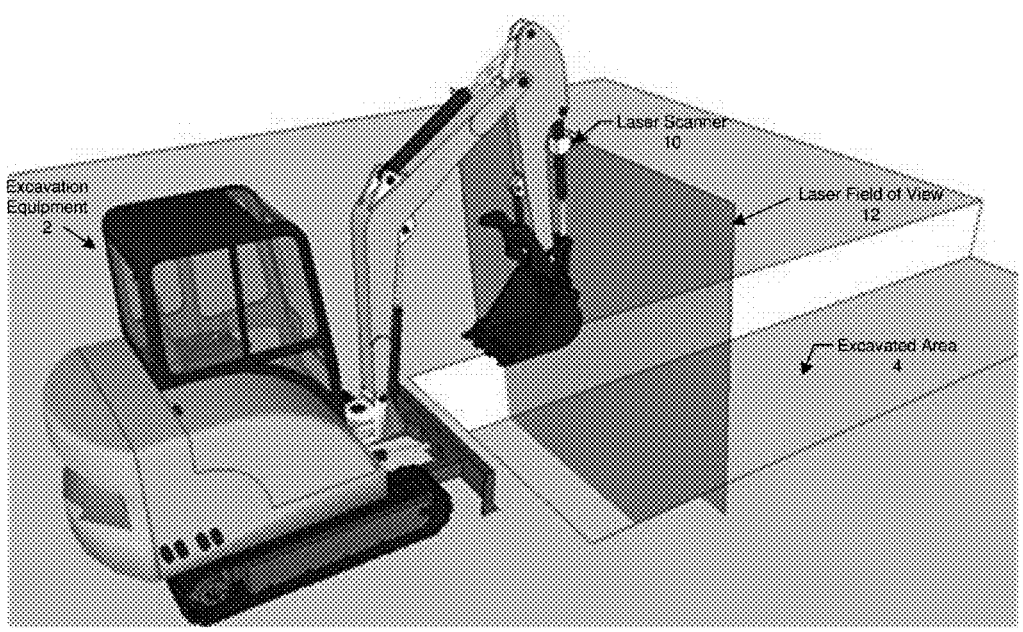

In one embodiment, as illustrated in the example of FIGS. 1 and 2, the laser sensor/scanner, such as laser sensor/scanner 10, is mounted on excavation or earthmoving equipment, such as excavation or earthmoving equipment 2, used to perform the excavation, such as excavated area 4. In one example, the excavation or earthmoving equipment 2 is an excavator, and the laser sensor/scanner 10 is mounted on the excavator. For example, as illustrated in the example of FIGS. 1 and 2, the laser sensor/scanner 10 is mounted on an arm (also referred to as a stick or dipper) of the excavator which has a bucket at an end thereof and is connected to a boom of the excavator for moving the arm and the bucket.

In one embodiment, the laser sensor/scanner 10 has a laser field of view 12 and creates or establishes an invisible light shield or "curtain" (e.g., class-1 infra-red eye safe light shield), including a two-dimensional (2D) and/or three-dimensional (3D) light array. As such, the laser sensor/scanner 10 functions as a measurement device to measure site topography, dimensions or other parameters (including changes or variations thereof) of an excavation, such as excavated area 4, including, for example, width, length, height (depth), slope (grade), including side slope and/or longitudinal slope, profile, and/or elevation of an excavation area.

Figure 3:
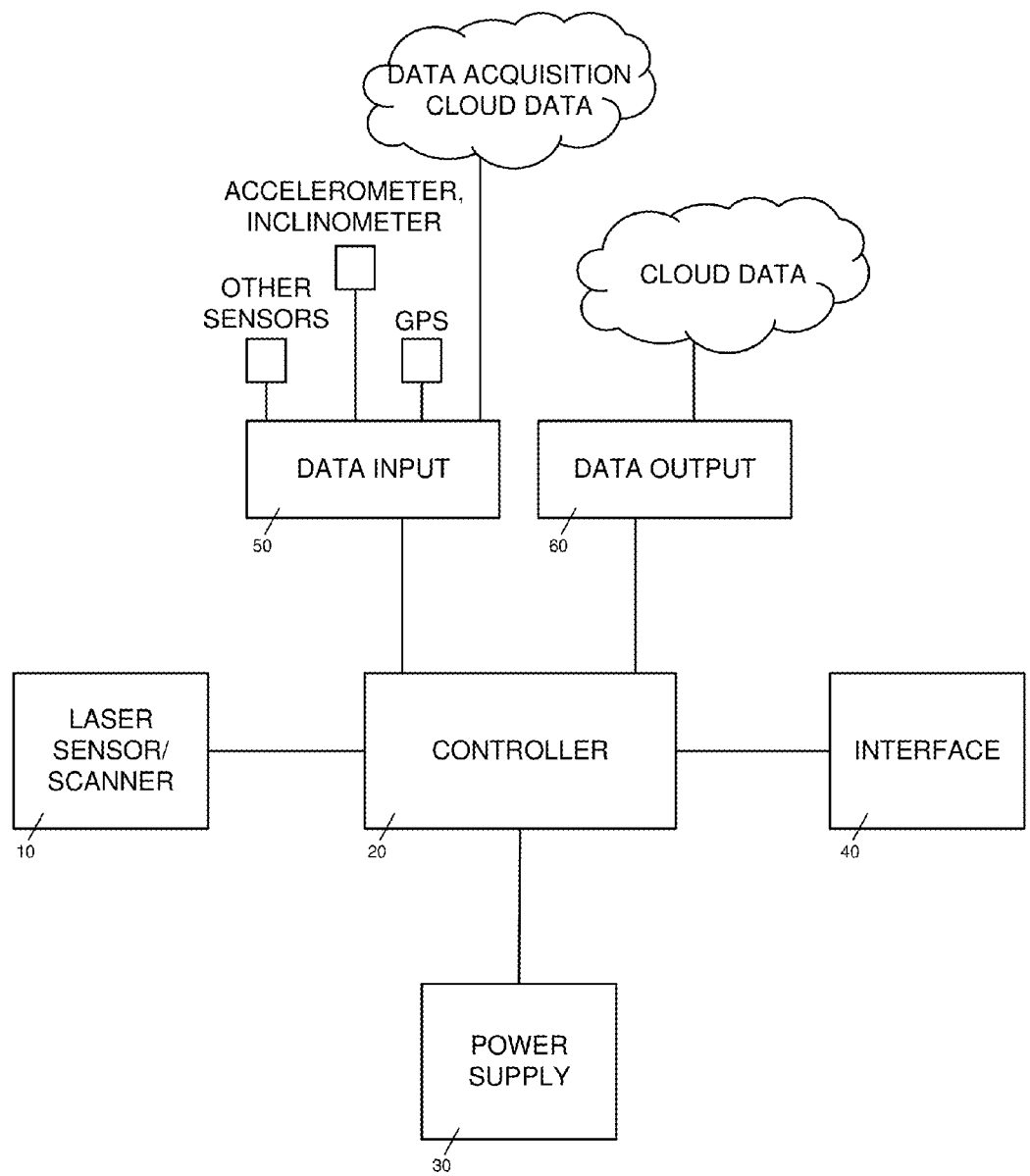
FIG. 3 illustrates an example of an excavation measurement system.

In one embodiment, as illustrated for example in FIG. 3, the excavation measurement system and method includes the laser sensor/scanner 10 and a controller or control unit 20 with which the laser sensor/scanner 10 (and other components, including associated hardware/software) is operatively and/or communicatively coupled so as to operate as an excavation measurement system. In one implementation, the laser sensor/scanner 10 includes a (one or more than one) two-dimensional (2D) or three-dimensional (3D) time-of-flight (TOF) or phase shift laser sensor/scanner (Lidar) or infrared rangefinder (collectively referred to herein as a/the laser sensor/scanner). In one implementation, the laser sensor/scanner 10 generates a 2D and/or 3D point cloud to represent the topography, dimensions or other parameters (including changes or variations thereof) of an excavation. Exemplary laser sensor(s)/scanner(s) useable within the system include the LMS and TiM line of laser scanners by Sick AG, the Velodyne series of 3D laser scanners, the Kinect sensor by Microsoft, and the PrimeSense Carmine sensor.

The laser sensor/scanner 10 may be hardwired or wirelessly communicated with the controller 20 such that output of the laser sensor/scanner 10 is provided to the controller 20. In one example, the controller 20 is operatively and/or communicatively coupled with the laser sensor/scanner 10 to provide for input to or configuration of the laser sensor/scanner 10 with, for example, a computing device (e.g., HMI, PC, tablet, portable device). The controller 20 may include a memory and a processor, with associated hardware and/or machine readable instructions (including firmware and/or software) embodied on a computer readable medium, for implementing and/or executing computer-readable, computer-executable instructions for data processing functions and/or functionality of the system and method.

In addition, the excavation measurement system includes a power supply 30. The power supply 30 may include an external power supply (e.g., from the excavation or earthmoving equipment), and/or may include an internal power supply (e.g., an internal battery).

In one embodiment, the excavation measurement system includes an interface 40, for example, a graphical user interface (GUI) or human machine interface (HMI), which can be used, for example, to display or communicate information of the system to an operator of excavation or earthmoving equipment. For example, information (data) of an excavation, such as for example, width, length, height (depth), slope (grade), including side slope and/or longitudinal slope, profile, and/or elevation of an excavation area, as measured by the laser/scanner, such as laser sensor/scanner 10, may be displayed to the operator of the excavation or earthmoving equipment. Such information may be displayed in real-time (or near real-time). As such, the operator may operate the excavation or earthmoving equipment (e.g., make adjustments to and/or with a ground engaging tool thereof) to achieve a desired dimension or other parameter (including changes or variations thereof) of the excavation. In addition, other operational and/or status information of the system may be displayed with the interface 40. In one implementation, the interface 40 also may be used to input information (data) for an excavation, such as for example, desired width, desired length, desired height (depth), desired slope (grade), including desired side slope and/or desired longitudinal slope, desired profile (e.g., a stepped trench), and/or desired elevation of an excavation. Such input may be performed, for example, by the operator of the excavation or earthmoving equipment. The interface 40 may include, for example, a PC, tablet, smartphone or other input/output and/or display device.

In one embodiment, the excavation measurement system includes additional data input 50 from one or more additional sensors and/or sources. For example, the system may be coupled with other sensor or sensing technology, such as GPS, inclinometer, accelerometer, and/or other sensors such as total station theodolite (TST), and/or jobsite laser. As such, an exact (nearly exact) position and/or absolute height may be derived or extrapolated, and various levels of machine automation can be achieved. In addition, data input 50 for the system, such as a desired dimension or other parameter of an excavation, may be acquired remotely (e.g., cloud data).

In one embodiment, the excavation measurement system also provides for data output 60 (in addition to data output to the interface). For example, measurement data may be recorded, for example, in a storage database, displayed, compiled, manipulated, transmitted or otherwise distributed to or via a GUI, HMI, PC, portable or handheld device (e.g., phone, tablet), or other computing or electronic device. In one implementation, output data 60 of the system may be communicated remotely (e.g., cloud data transmitted via cellular, Wi-Fi, or other means of communication) to enable remote monitoring and/or documentation of the excavation process, such as the progress, efficiency, and/or quality of the excavation. As such, the system may be included as part of a communications based system for performance metrics and/or jobsite tracking.

Figure 4:
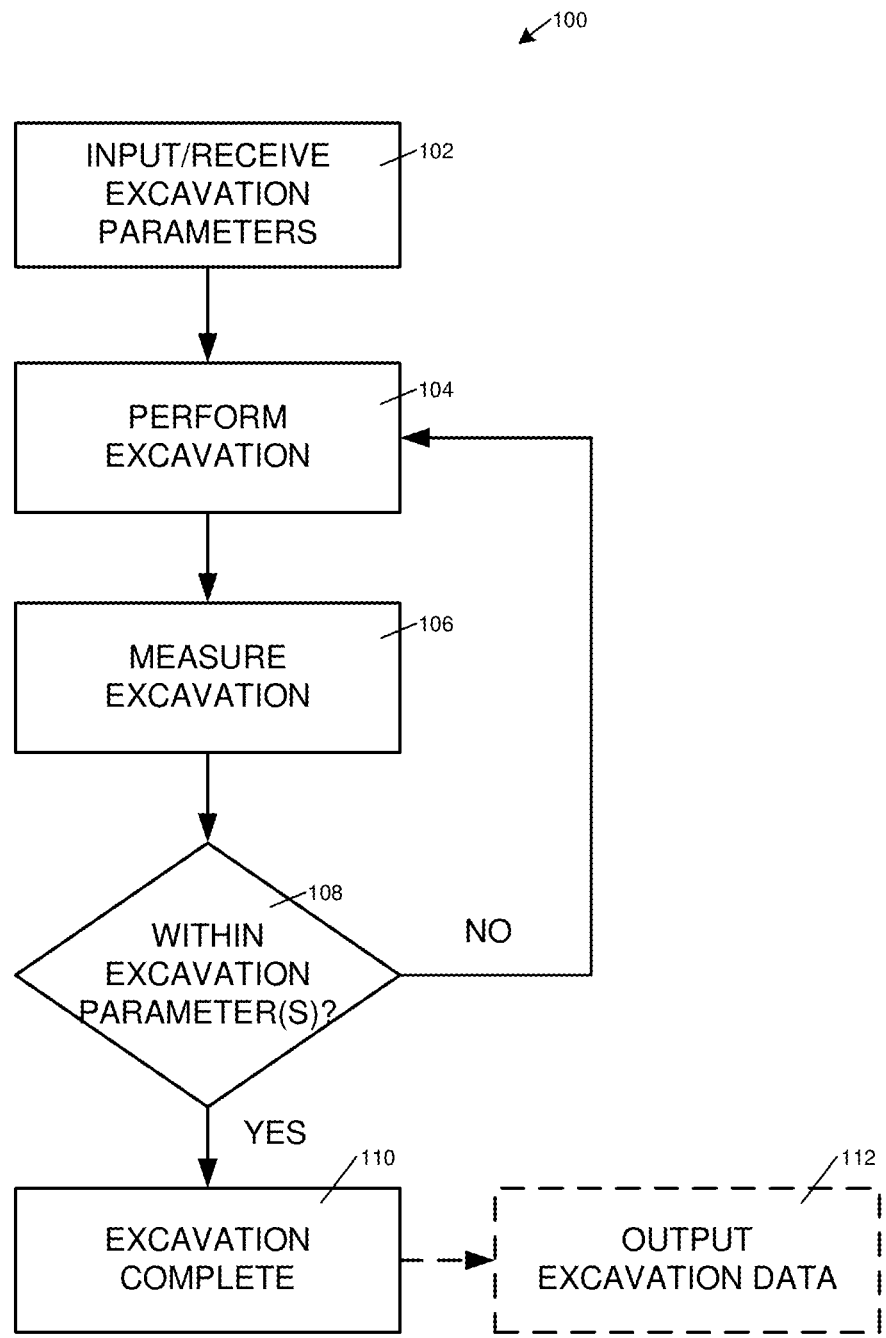
FIG. 4 illustrates an example of an excavation measurement method.

One example of an excavation measurement method, such as method 100, is illustrated in FIG. 4. In one embodiment, the method, for example at 102, includes inputting and/or receiving a desired parameter or parameters of an excavation. For example, desired width, desired length, desired height (depth), desired slope (grade), including side slope and/or longitudinal slope, desired profile, and/or desired elevation of an excavation may be input via the interface, such as interface 40. Such parameter(s) may also be transmitted remotely and received by the system. In one example, the current site topography, as input, received and/or measured by the laser sensor/scanner, such as laser sensor/scanner 10, and the desired parameter(s) of an excavation are displayed, for example, with the interface, such as interface 40, or otherwise communicated to an operator of excavation or earthmoving equipment which is to be used to perform the excavation.

In one embodiment, with the parameter(s) of the excavation defined or established, the method, for example at 104, includes performing the excavation, for example, beginning or continuing excavation, with the excavation or earthmoving equipment.

In one embodiment, the method, for example at 106, includes measuring the excavation with the laser sensor/scanner, such as laser sensor/scanner 10. Measuring the excavation includes sensing or scanning the excavation with the laser sensor/scanner, such as laser sensor/scanner 10, and may be performed before, during and/or after excavating. Measuring the excavation during excavating may be performed, for example, by stopping the excavating and measuring the excavation with the laser sensor/scanner, such as laser sensor/scanner 10. As such, the system, including the operator of the excavation or earthmoving equipment, may assess the progress of the excavating, and may continue (or discontinue) accordingly.

In one embodiment, with measurement of the excavation, the method, for example at 108, determines whether the excavation is within the defined or established parameter(s) of the excavation. In one embodiment, progress of the excavation may be displayed, for example, with the interface, such as interface 40, or otherwise communicated to the operator of the excavation or earthmoving equipment. The current progress of the excavation may be displayed, for example, with the desired parameter(s) of the excavation, to provide feedback to the operator as to the progress of the excavation.

If the excavation is within the desired parameter(s), the excavation is complete, for example at 110. If, however, the excavation is not within the desired parameter(s), performing the excavation, for example at 104, continues. As such, the method repeats measuring the excavation with the laser sensor/scanner, for example at 106, and repeats determining whether the excavation is within the defined or established parameter(s) of the excavation, for example at 108.

In one embodiment, the method, for example at 112, includes outputting excavation data (e.g., cloud data) to enable remote monitoring and/or documentation of the excavation process.

In one embodiment, as illustrated for example in FIGS. 1 and 2, to measure an excavation (or an excavation area or site prior to excavation), the laser sensor/scanner 10 is positioned or oriented such that the laser field of view 12 creates or establishes the light shield or curtain so as to extend into the excavation (e.g., generally perpendicular to a direction of the excavation), such as excavated area 4. For example, in one implementation, the laser sensor/scanner 10 is positioned or oriented above the excavation, such as excavated area 4, such that the laser field of view 12 creates or establishes an invisible light shield or curtain which extends a depth of the excavation, such as excavated area 4 (i.e., vertical (substantially vertical) or perpendicular (substantially perpendicular) to horizontal).

In one embodiment, the system guides or provides feedback to the operator as to the position or orientation of the laser sensor/scanner 10, including, for example, perpendicularity of the laser field of view 12. Such position or orientation may be displayed, for example, with the interface 40, or otherwise communicated to the operator. Although the laser field of view 12 is illustrated and described as being generally perpendicular to a direction of the excavation (e.g., vertical (substantially vertical) or perpendicular (substantially perpendicular) to horizontal), the laser sensor/scanner 10 may be positioned or oriented such that the laser field of view 12 creates or establishes the light shield or curtain at an angle (non-orthogonal angle) to horizontal. In one embodiment, the system compensates for an angled (e.g., non-vertical) laser field of view 12 based on input from an inclinometer.

Figure 5:
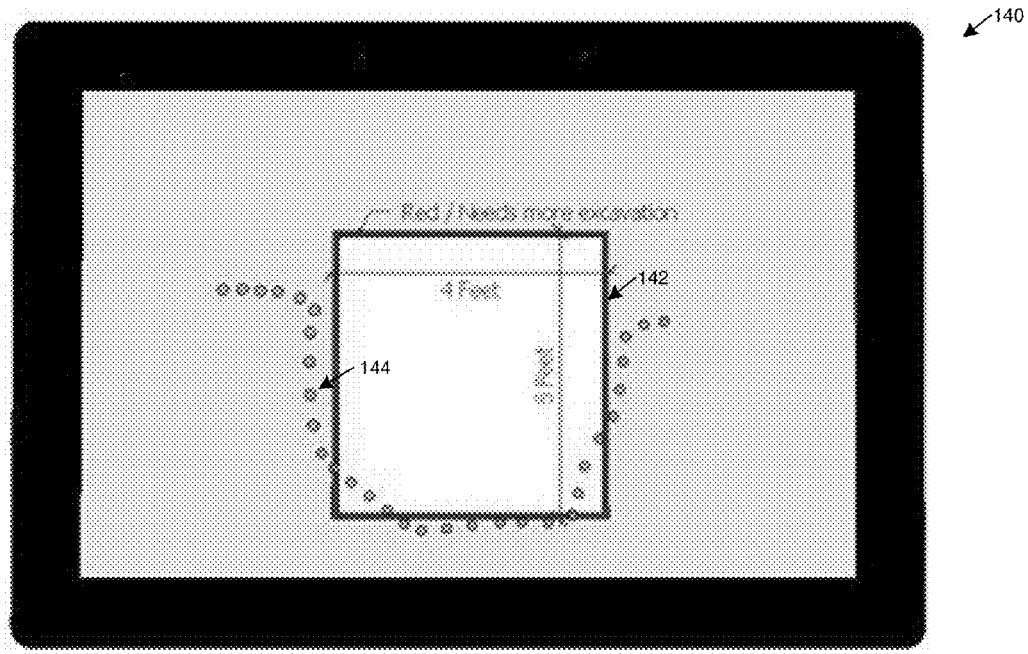
FIGS. 5 and 6 illustrate an example of an interface of an excavation measurement system.
Figure 6:
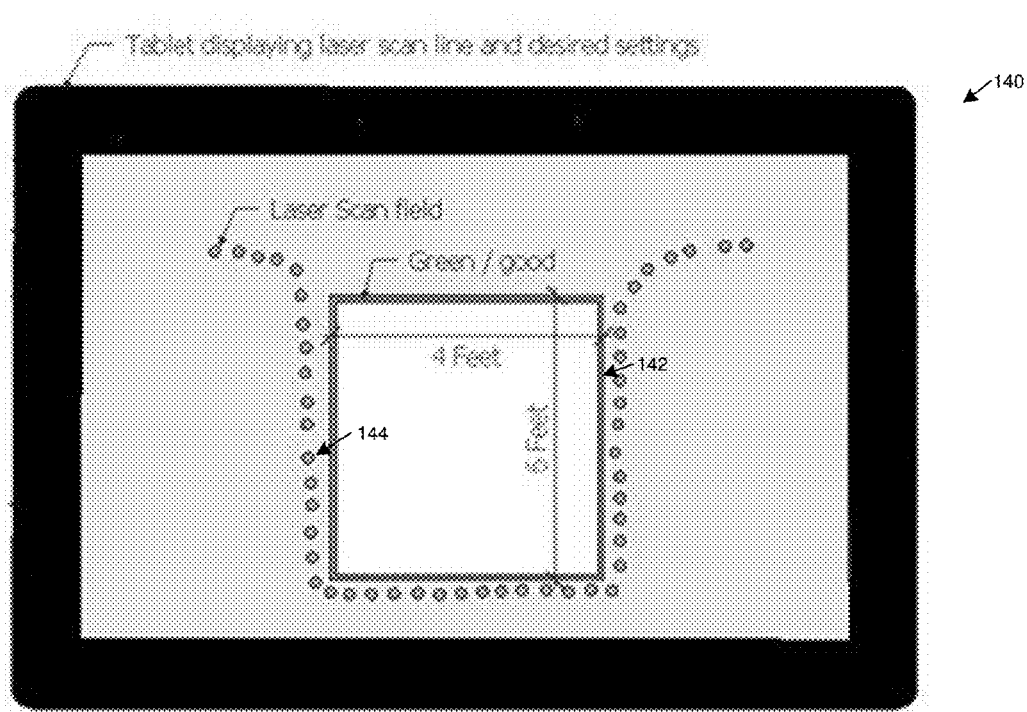

FIGS. 5 and 6 illustrate an example of an interface 140, as an example of interface 40, of the excavation measurement system. The interface 140 may display or communicate, for example, information (data) of an excavation, such as for example, width, length, height (depth), slope (grade), including side slope and/or longitudinal slope, profile, and/or elevation of an excavation area, as measured by the laser/scanner, such as laser sensor/scanner 10. In one implementation, the measurement data from the laser sensor/scanner, such as laser sensor/scanner 10, is displayed in real time (or near real-time).

In one embodiment, a desired dimension(s) or other parameter(s) of the excavation is displayed in relation to an unexcavated (or partially excavated) cross section of the area being excavated. For example, as illustrated in FIG. 5, a schematic cross-sectional representation of the desired width and height (depth) of the excavation, as an example of a desired dimension(s) or other parameter(s) 142 of the excavation, is displayed in relation to a partially excavated cross section of the area being excavated, such as excavation 144. In one embodiment, the system provides an indication to the operator that further excavating is needed to achieve the desired dimension(s) or other parameter(s) of the excavation. In one implementation, as illustrated in the example of FIG. 5, the system provides a visual indication, for example, with color (e.g., red) and/or a message, that further excavating is needed. As such, the operator may operate the excavation or earthmoving equipment (e.g., make adjustments to and/or with a ground engaging tool thereof) to achieve the desired dimension(s) or other parameter(s) 142 of the excavation 144.

In one embodiment, once the desired dimension(s) or other parameter(s) of the excavation is achieved, the system provides an indication of such to the operator. For example, as illustrated in FIG. 6, the system provides a visual indication, for example, with color (e.g., green, change from red to green) and/or a message, that the desired dimension(s) or other parameter(s) 142 of the excavation 144 has been achieved.

Figure 7:
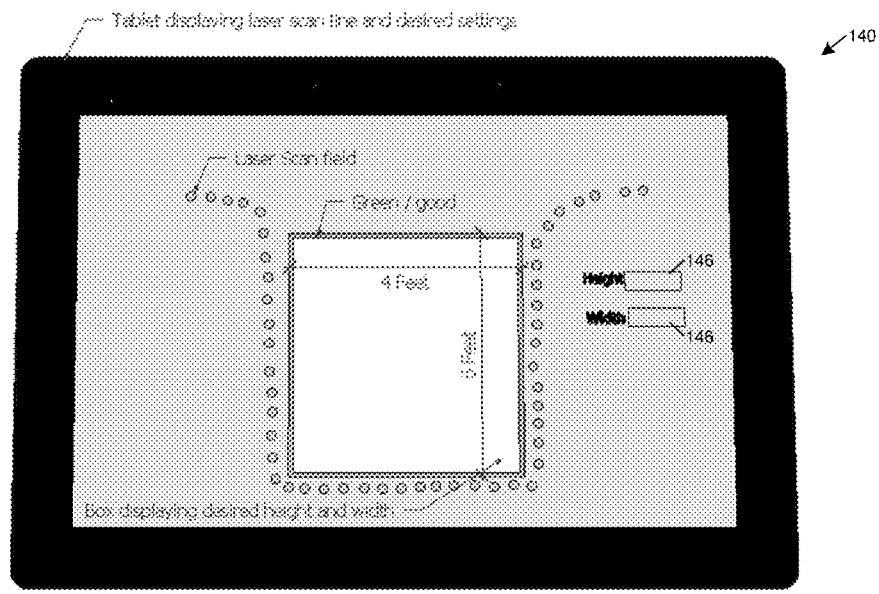
FIG. 7 illustrates an example of an interface of an excavation measurement system.

In one implementation, as illustrated in the example of FIG. 7, the interface 140, as an example of interface 40, includes one or more input or data-entry fields, such as input or data-entry fields 146, which may be used to input information for an excavation, such as for example, desired width, desired length, desired height (depth), desired slope (grade), desired profile, and/or desired elevation. Such input may be performed, for example, by the operator of the excavation or earthmoving equipment. Information (data) for such input may also be acquired remotely.

Figure 8:
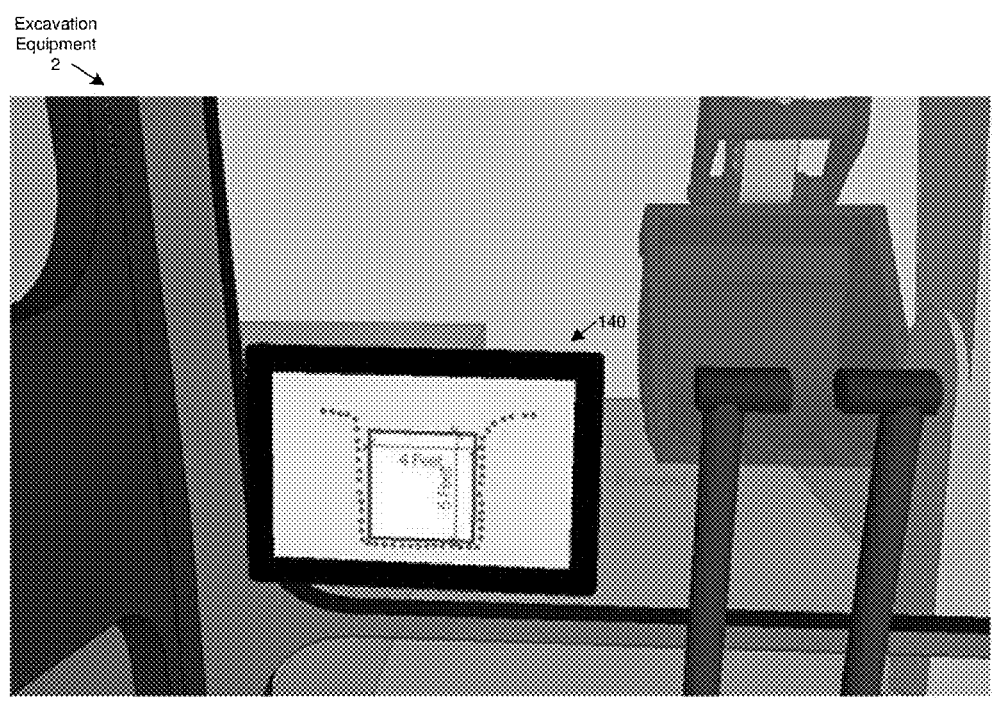
FIG. 8 illustrates an example of an interface of an excavation measurement system mounted on excavation or earthmoving equipment.

In one embodiment, the interface 140, as an example of interface 40, is mounted or displayed within view of the operator of the excavation or earthmoving equipment. In one implementation, the interface 140 is mounted or supported on the excavation or earthmoving equipment, such as excavation or earthmoving equipment 2, for example, within a cab of the excavation or earthmoving equipment 2, as illustrated in FIG. 8.

Figure 9:
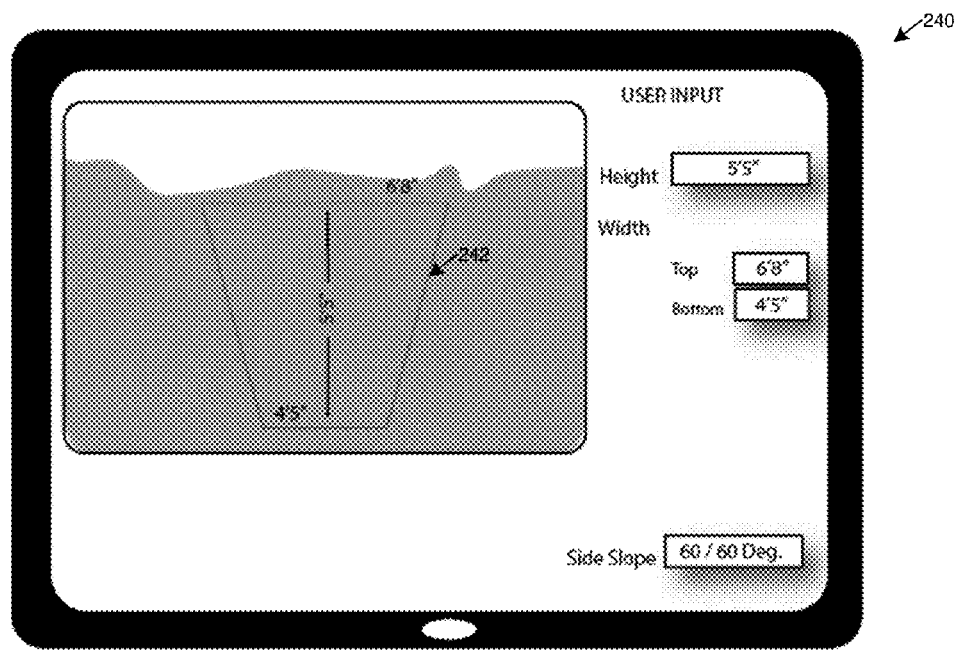
FIGS. 9, 10, 11, 12, and 13 illustrate an example of an interface of an excavation measurement system.
Figure 10:
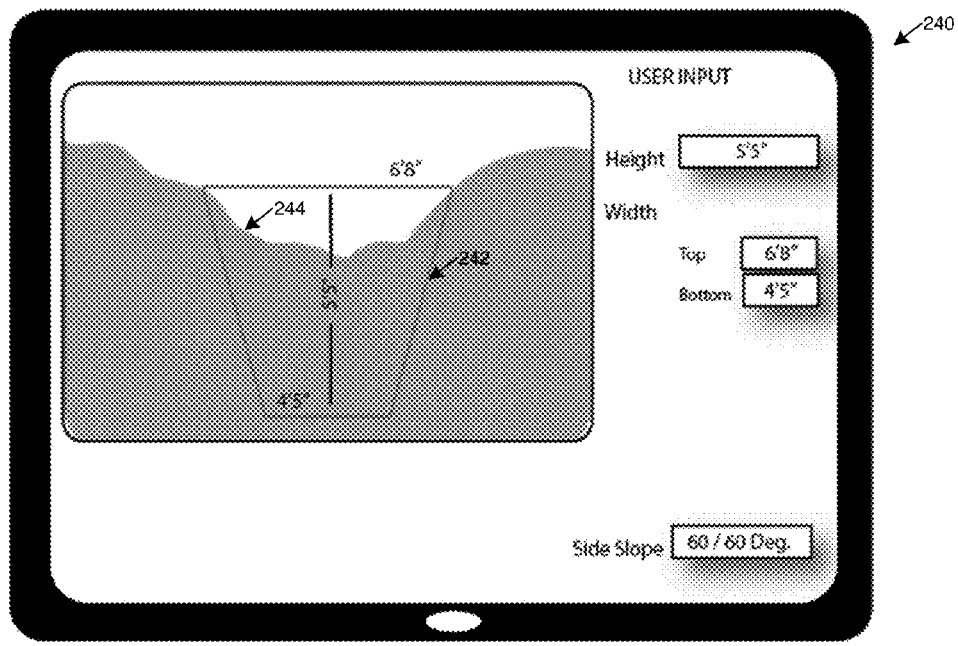
Figure 11:
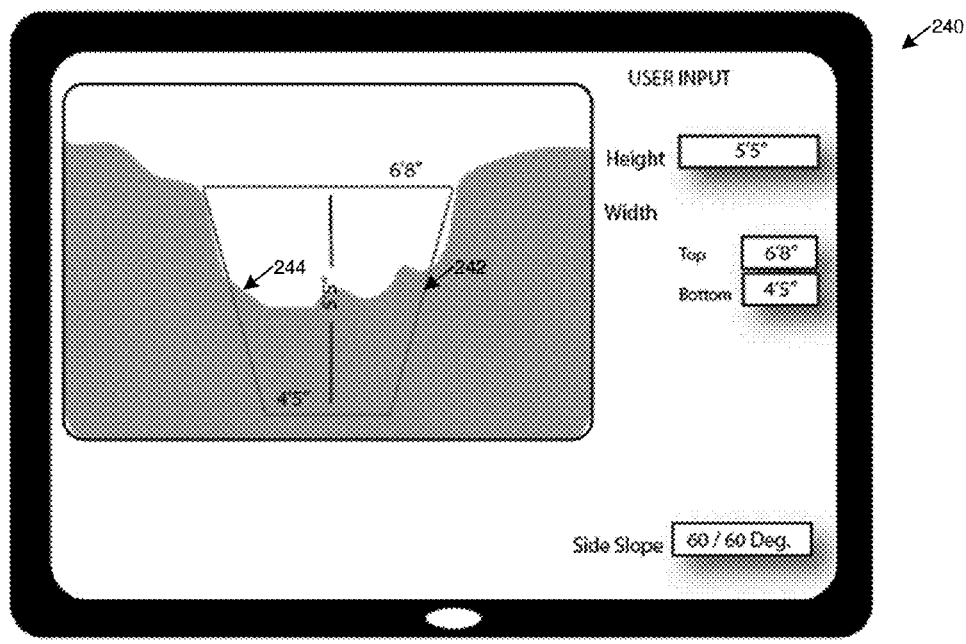
Figure 12:
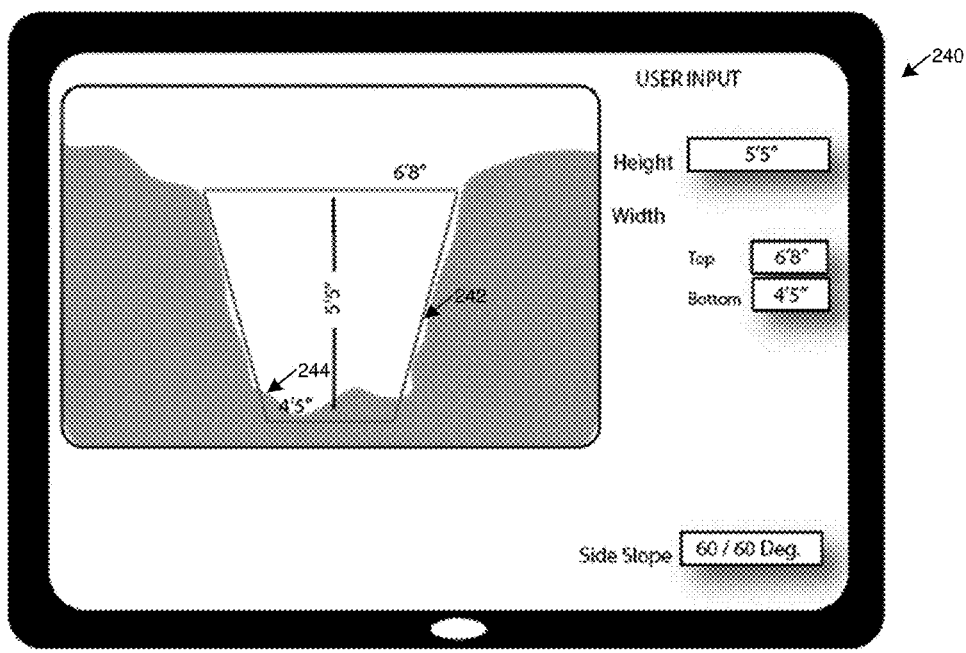
Figure 13:
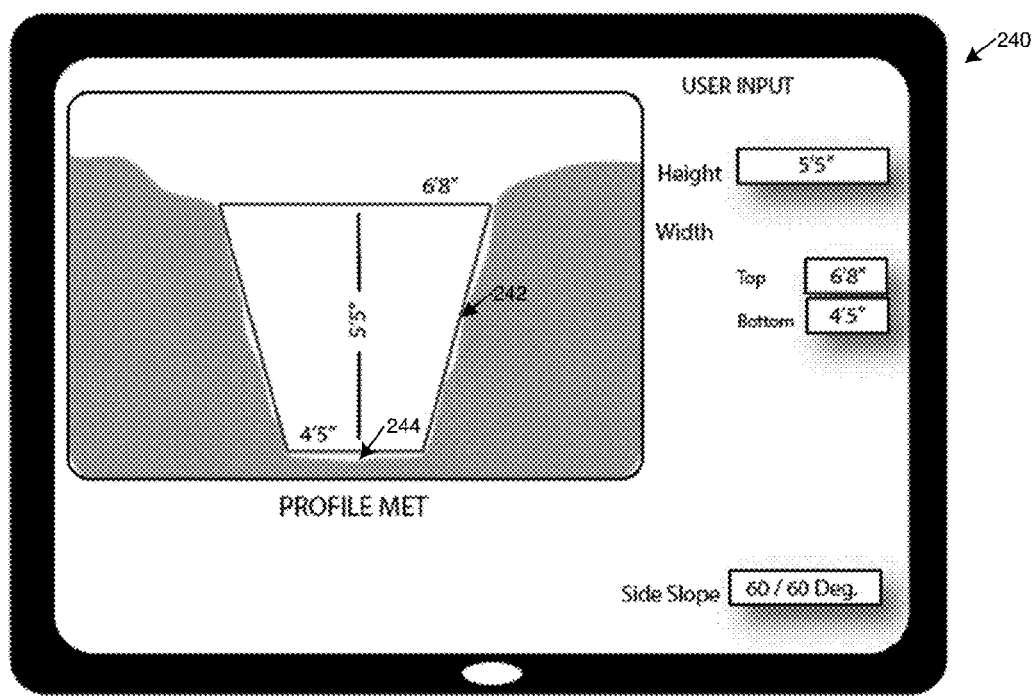

FIGS. 9, 10, 11, 12, and 13 illustrate an example of an interface 240, as an example of interface 40, of the excavation measurement system, with the interface 240 illustrating a sequence of performing an example excavation, such as excavation 244. In the illustrated example, the interface 240 displays information for the excavation 244, such as for example, height (depth), width (at the top and the bottom of the excavation), and slope (side slope) of the excavation 244. In the illustrated example, a schematic cross-sectional representation of the desired dimensions or parameters, such as desired dimension(s) or other parameter(s) 242, of the excavation 244 is displayed in relation to an unexcavated (or partially excavated) cross section of the area being excavated. As such, the operator may operate the excavation or earthmoving equipment (e.g., make adjustments to and/or with a ground engaging tool thereof) to achieve the desired dimensions or parameters of the excavation. For example, FIG. 9 illustrates the desired dimensions or parameters 242 of the excavation 244 in relation to an unexcavated cross section of the area to be excavated, and FIGS. 10, 11, and 12 illustrate the desired dimensions or parameters 242 of the excavation 244 in relation to a partially excavated cross section of the area being excavated during the excavation. In one embodiment, as illustrated in the example of FIG. 13, the system provides an indication (e.g., a message) to the operator once the desired dimensions or parameters 242 of the excavation 244 have been achieved.

Figure 14:
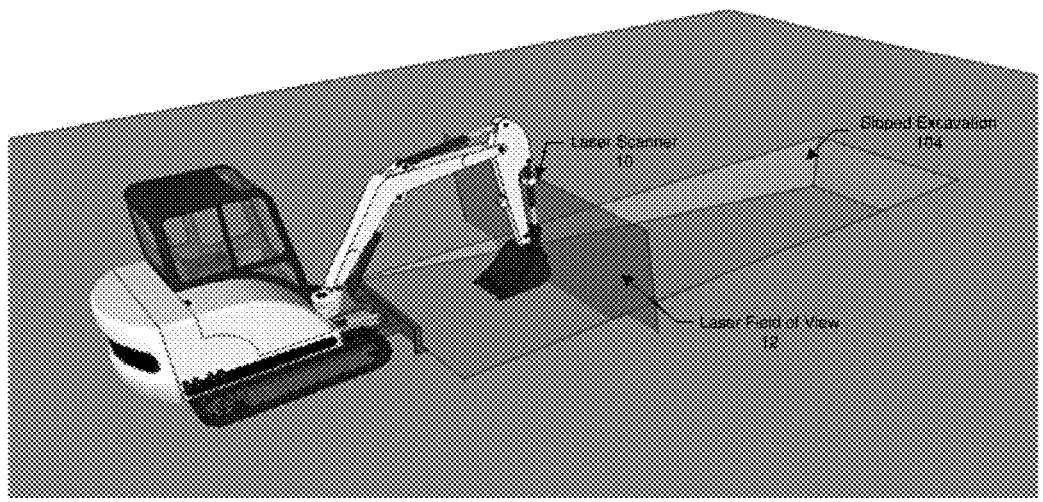
FIGS. 14 and 15 illustrate an example of an excavation measurement system and method.
Figure 15:
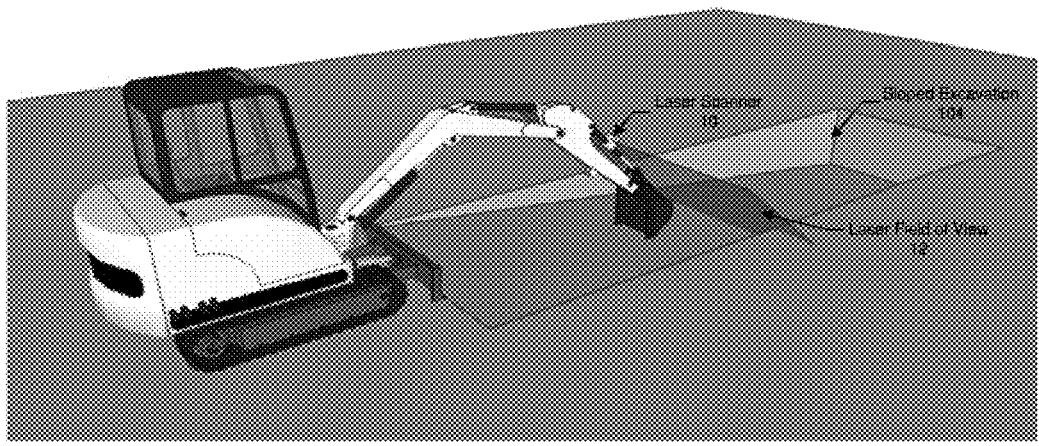

In one embodiment, as illustrated for example in FIGS. 14 and 15, a longitudinal slope of an excavation (e.g., a slope substantially parallel with a length of the excavation) may be calculated or estimated based on multiple measurement readings by the laser sensor/scanner 10. For example, in one implementation, a longitudinal slope of an excavation, such as sloped excavation 104, may be calculated or estimated by performing multiple (e.g., a plurality or sequence of) measurement readings with the laser sensor/scanner 10. For example, as illustrated in FIG. 14, a first measurement may be performed with the laser sensor/scanner 10 at a first position (e.g., the arm/dipper/stick of the excavator at a first position) and, as illustrated in FIG. 15, a second measurement may be performed with the laser sensor/scanner 10 at a second position (e.g., the boom extended and the arm/dipper/stick of the excavator at a second position spaced longitudinally from the first position). As such, a longitudinal slope of an excavation, such as sloped excavation 104, may be calculated or estimated based on measurement readings of the laser sensor/scanner 10 at different positions.

In one implementation, the laser/scanner, such as laser sensor/scanner 10, may be positioned or oriented to create a field of view oriented substantially perpendicular to a slope. As such, the system may measure or calculate a degree (grade) of the slope.

Figure 16:
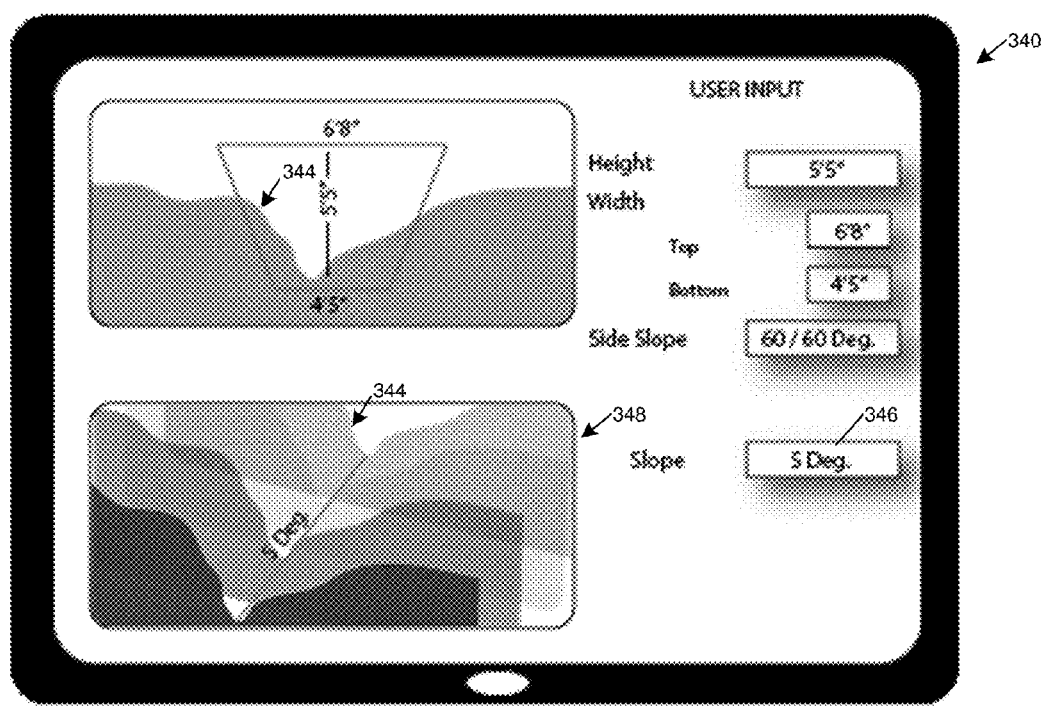
FIG. 16 illustrates an example of an interface of an excavation measurement system.

In one implementation, as illustrated in the example of FIG. 16, a longitudinal slope of an excavation (e.g., a slope substantially parallel with a length of the excavation), such as excavation 344, may be displayed on the interface 340, as an example of interface 40, as a series of cross-sectional images (e.g., representing different positions of measurement readings by the laser sensor/scanner), such as images 348. In addition, a desired longitudinal slope of the excavation, as displayed, for example, in input or data-entry field 346, and/or a desired length of the excavation longitudinally along a bottom of the excavation may be entered into the system via the interface 340.

Figure 17:
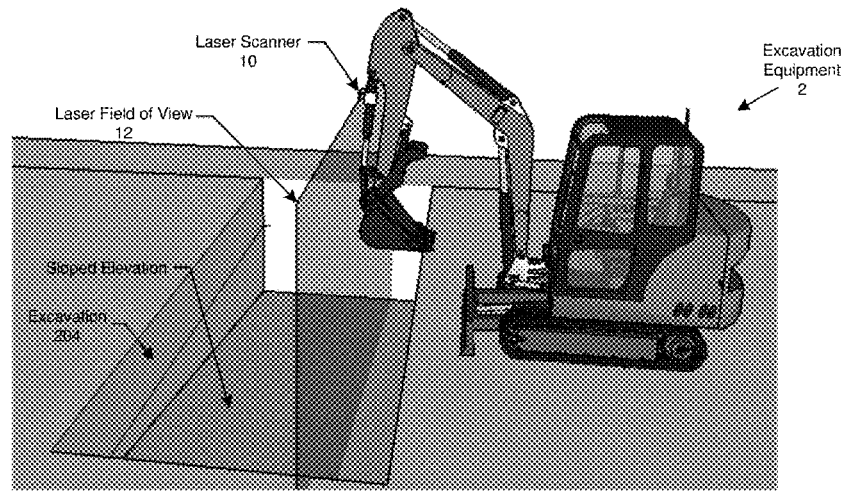
FIGS. 17 and 18 illustrate an example of an excavation measurement system and method.
Figure 18:
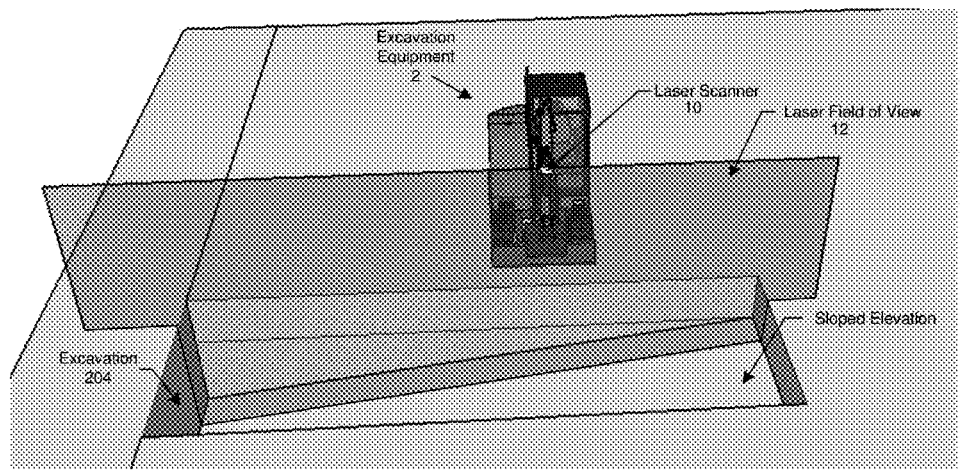

In one embodiment, a longitudinal profile (slope scan) of an excavation may be measured by positioning or orienting the laser sensor/scanner 10 such that the laser field of view 12 extends along a length of the excavation. For example, as illustrated in FIGS. 17 and 18, a longitudinal profile (slope scan) of an excavation, such as sloped elevation of excavation 204, may be measured by positioning the excavation or earthmoving equipment, such as excavation or earthmoving equipment 2, along a side of the excavation 204 and orienting the laser field of view 12 of the laser sensor/scanner 10 to extend along a length of the excavation 204.

Figure 19:
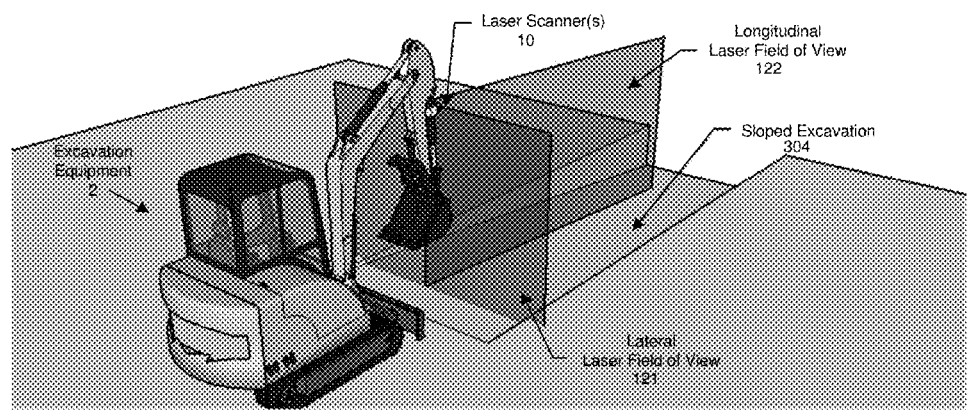
FIGS. 19 and 20 illustrate an example of an excavation measurement system and method.
Figure 20:
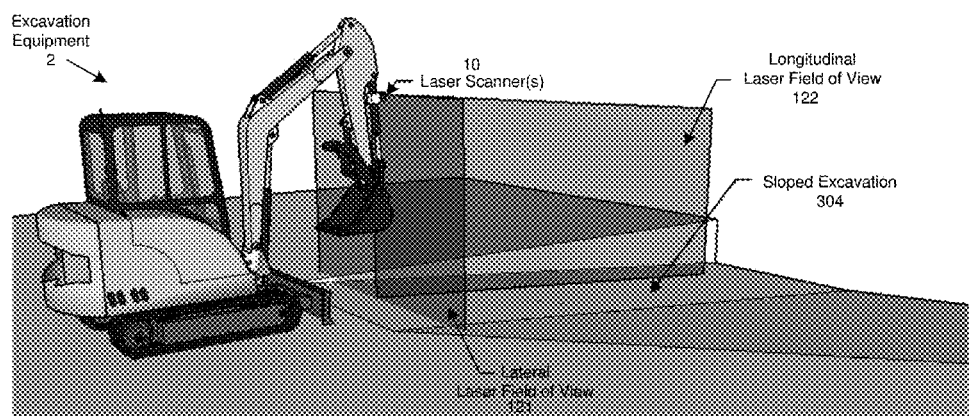

In one embodiment, as illustrated for example in FIGS. 19 and 20, a lateral laser field of view 121 and a longitudinal laser field of view 122 may be used to measure an excavation, such as excavation 304. For example, the lateral laser field of view 121 may be oriented substantially parallel with a width of the excavation 304 and the longitudinal laser field of view 122 may be oriented substantially parallel with a length of the excavation 304. As such, a width and a side-to-side profile (cross-section scan) of the excavation 304, as measured, for example, with the lateral laser field of view 121, and a length and a longitudinal profile (slope scan) of the excavation 304, as measured, for example, with the longitudinal laser field of view 122, may be generated.

In one implementation, the lateral laser field of view 121 and the longitudinal laser field of view 122 may be established by changing a position or orientation of the laser sensor/scanner 10. For example, the laser sensor/scanner 10 may be rotated (e.g., through an angle of approximately 90 degrees) between a first position (e.g., at which the lateral laser field of view 121 is established) and a second position (e.g., at which the longitudinal laser field of view 122 is established). As such, to measure an excavation, the laser sensor/scanner 10 may perform a first measurement reading of the excavation in the first position and perform a second measurement reading of the excavation in the second position. In one embodiment, a rotational mechanism is used to rotate the laser sensor/scanner 10 between different positions (e.g., different angular positions). The rotational mechanism may be incorporated with the laser sensor/scanner 10 and/or may be incorporated with mounting of the laser sensor/scanner 10, for example, on the excavation or earthmoving equipment.

In one implementation, the lateral laser field of view 121 and the longitudinal laser field of view 122 may be established by using two laser sensors/scanners, such as two laser sensors/scanners 10. For example, to measure an excavation, a first laser sensor/scanner may be used to perform a first measurement reading of the excavation with a lateral laser field of view and a second laser sensor/scanner may be used to perform a second measurement reading of the excavation with a longitudinal laser field of view. In one embodiment, both laser sensors/scanners 10 are mounted (e.g., together or separately) on the excavation or earthmoving equipment. Such measurement readings may be obtained simultaneously (substantially simultaneously) or sequentially.

In one implementation, the lateral laser field of view 121 and the longitudinal laser field of view 122 may be established by using a 3D/multi-planer time-of-flight (TOF) or phase shift laser sensor/scanner (Lidar) or infrared rangefinder. As such, in measuring an excavation, a measurement reading of the excavation with a lateral laser field of view and a measurement reading of the excavation with a longitudinal laser field of view may be derived from a single laser sensor/scanner, such as laser sensor/scanner 10. Such measurement readings may be obtained simultaneously (substantially simultaneously) or sequentially.

Although illustrated and described as establishing a lateral laser field of view 121 and a longitudinal laser field of view 122, other fields of view (including other combinations of fields of view) of the laser sensor/scanner 10 may be established. For example, the laser sensor/scanner may be rotated to other angles, the two laser sensors/scanners may be oriented at other angles, and/or the 3D laser sensor/scanner may measure at other angles.

Figure 21:
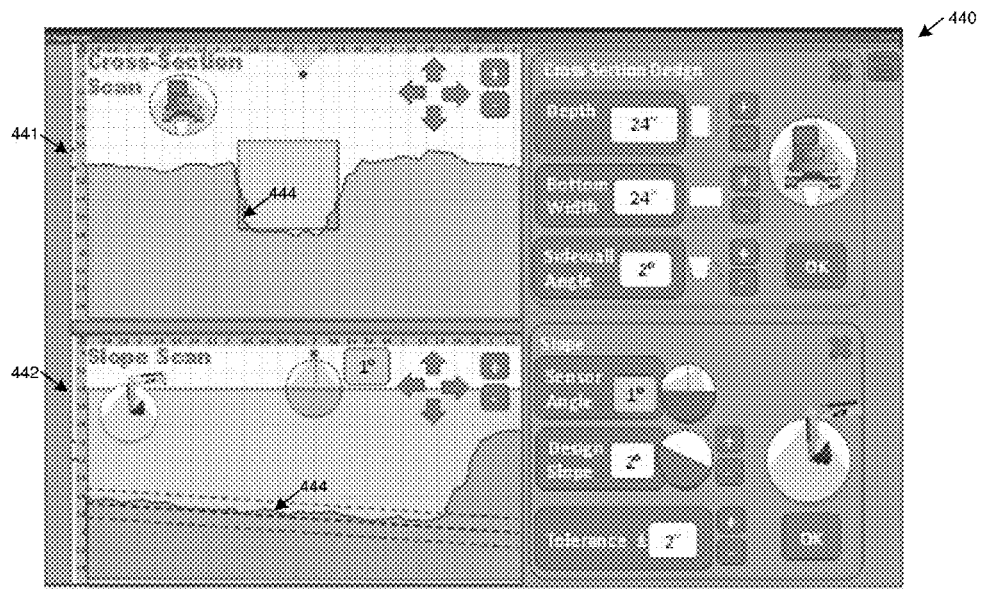
FIG. 21 illustrates an example of an interface of an excavation measurement system.
Figure 22:
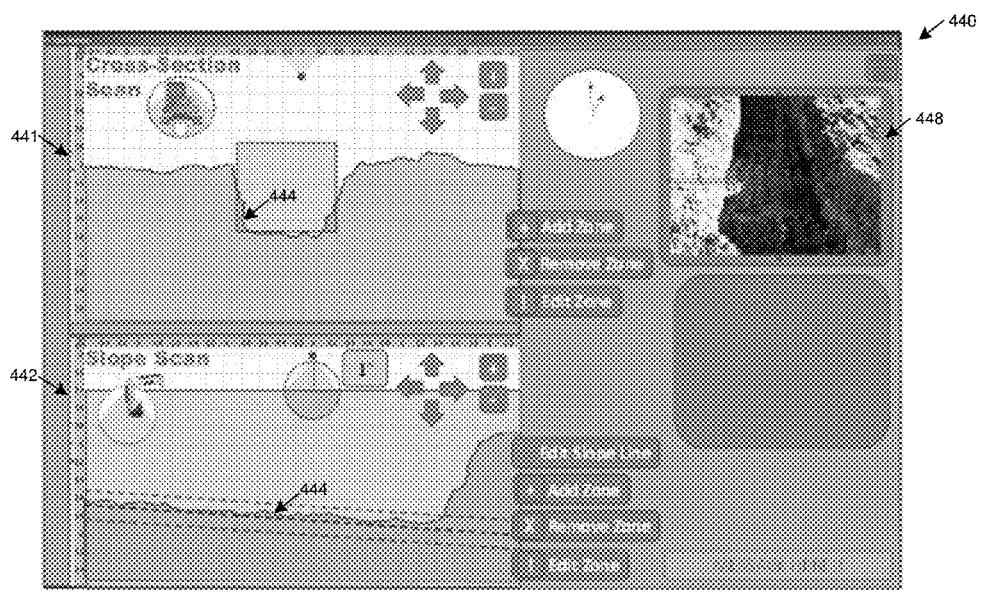
FIG. 22 illustrates an example of an interface of an excavation measurement system.

In one embodiment, as illustrated in the examples of FIGS. 21 and 22, the interface 440, as an example of interface 40, provides a schematic representation of a side-to-side profile 441 (cross-section scan) of an excavation, such as excavation 444, as measured, for example, with the laser field of view 12 of FIG. 14 or 15, or the lateral laser field of view 121 of FIG. 19 or 20, and a longitudinal profile 442 (slope scan) of an excavation, such as excavation 444, as measured, for example, with the laser field of view 12 of FIG. 17 or 18, or the longitudinal laser field of view 122 of FIG. 19 or 20.

In one embodiment, the excavation measurement system includes an image capture device to record or capture video and/or still images of the excavation. As such, in one implementation, and as illustrated in the example of FIG. 22, the interface 440 may display an image (e.g., video and/or still images), such as image 448, of the excavation 444.

Figure 23:
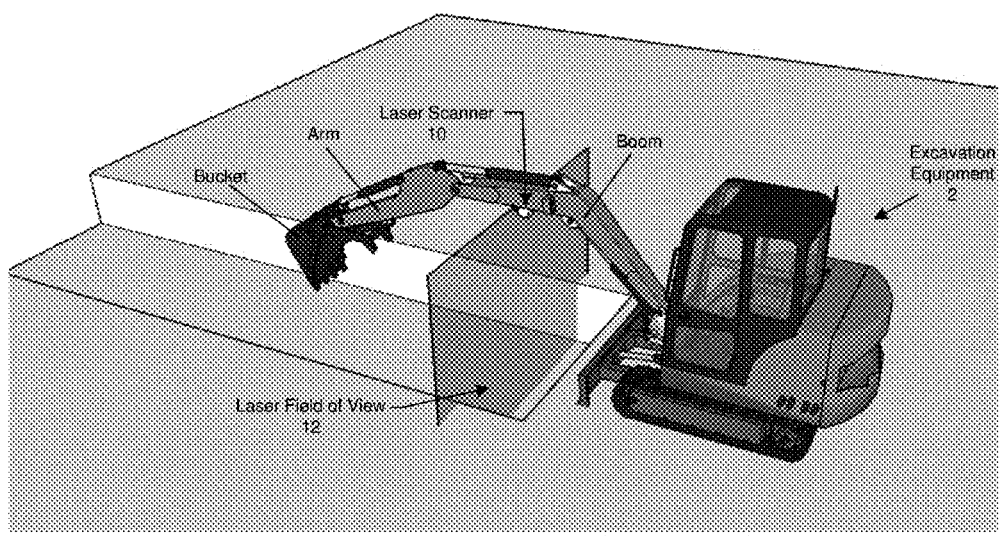
FIG. 23 illustrates an example of an excavation measurement system and method.
Figure 24:
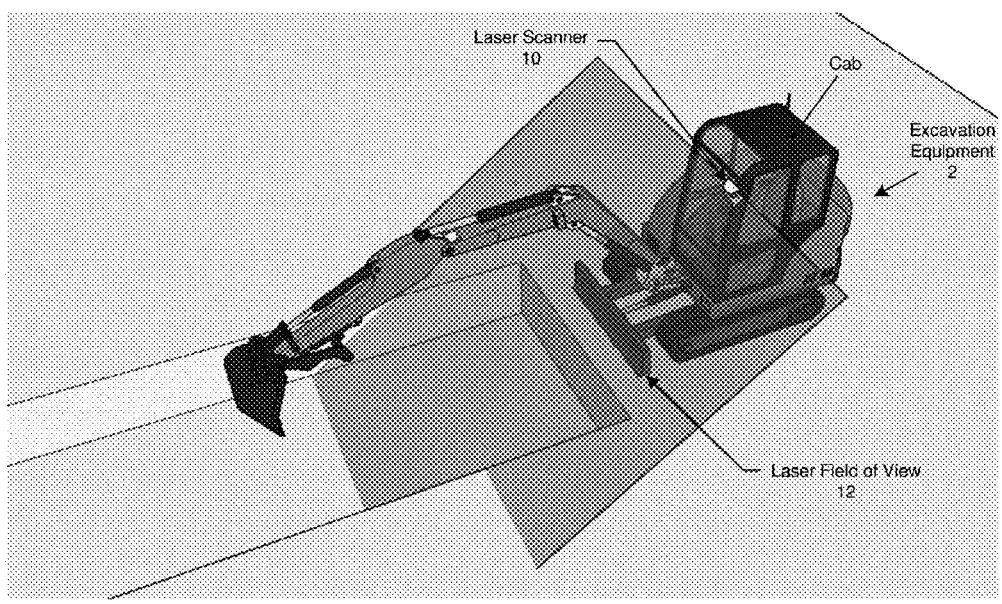
FIG. 24 illustrates an example of an excavation measurement system and method.
Figure 25:
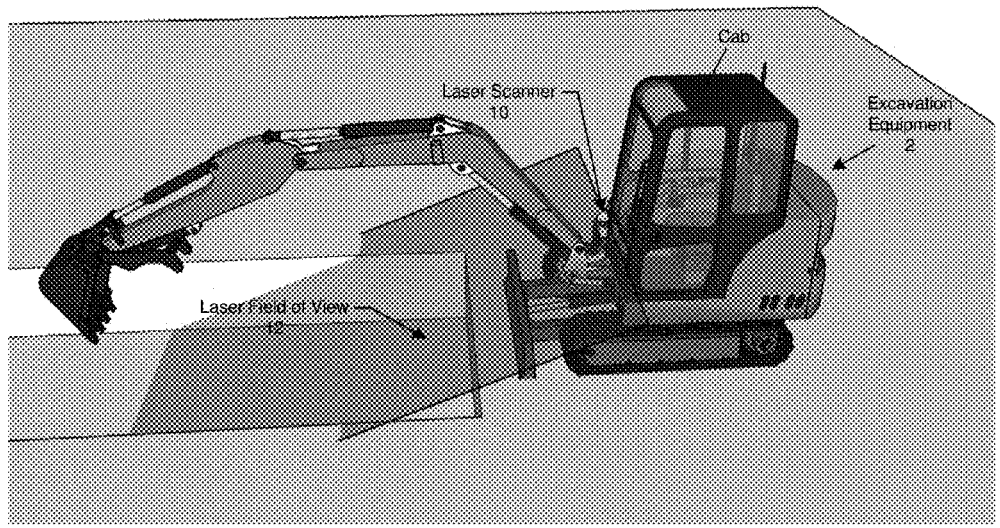
FIG. 25 illustrates an example of an excavation measurement system and method.
Figure 26:
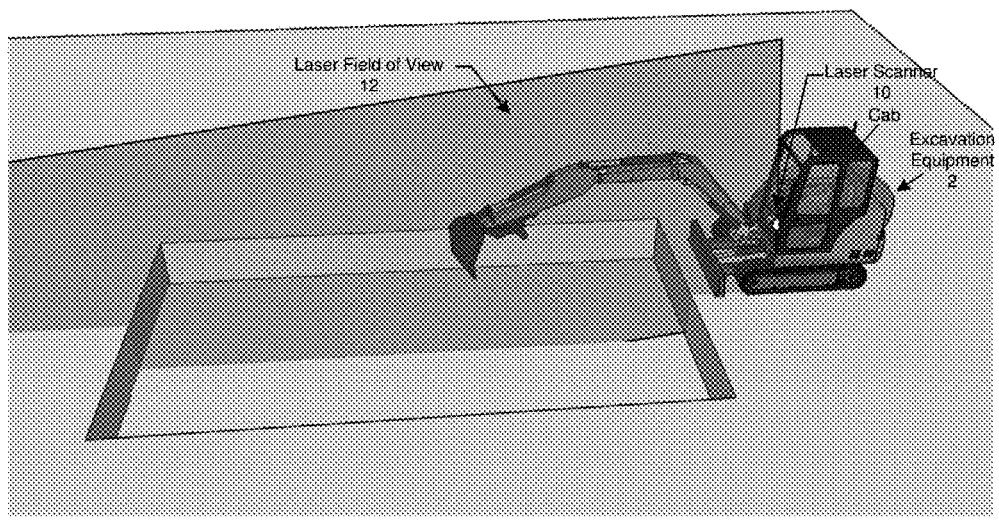
FIG. 26 illustrates an example of an excavation measurement system and method.
Figure 27:
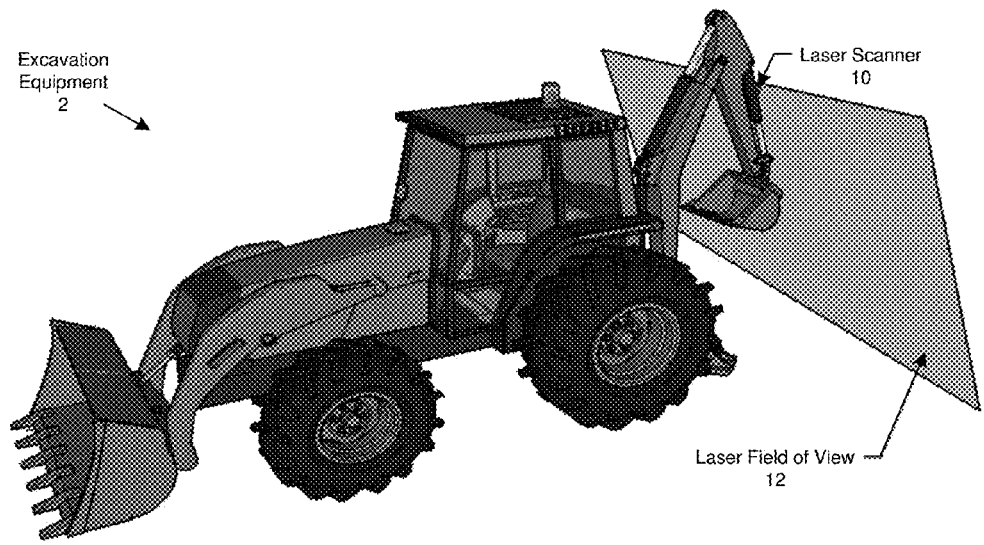
FIG. 27 illustrates an example of an excavation measurement system.

Although illustrated and described above as being mounted on an arm/dipper/stick of an excavator, the laser sensor/scanner 10 may be mounted on other parts, locations or areas of a piece of excavation or earthmoving equipment. For example, as illustrated in the example of FIG. 23, the laser sensor/scanner 10 may be mounted on a boom of an excavator, as an example of excavation or earthmoving equipment 2, which has an arm/dipper/stick (with a bucket) attached thereto for moving the arm (and the bucket). In addition, the laser sensor/scanner 10 may be mounted on a cab (or body, chassis, frame) of a piece of excavation or earthmoving equipment, including, for example, a cab (or body, chassis, frame) of an excavator, as an example of excavation or earthmoving equipment 2, as illustrated in the examples of FIGS. 24, 25, and 26. Furthermore, the laser sensor/scanner 10 may be mounted on other equipment, for example, other excavation or earthmoving equipment. For example, the laser sensor/scanner 10 may be mounted on a backhoe, as an example of excavation or earthmoving equipment 2, as illustrated in the example of FIG. 27, a bulldozer, a grader, a front end loader, a trencher, etc.

As described above, the system and method disclosed herein uses a 2D and/or 3D time-of-flight (TOF) or phase shift laser sensor/scanner (Lidar) or infrared rangefinder to provide measurement data of an excavation (or area to be excavated). In one embodiment, the laser sensor/scanner is mounted on a piece of equipment performing (or to be performing) the excavation and functions as a measurement device such that the invisible light shield creates a measurement "curtain" (including a 2D and/or 3D measuring array) within the laser field of view. As such, the system and method may provide real-time (or near real-time) measurement data to an operator of excavation or earthmoving equipment (e.g., via an interface display). Thus, the operator can perform or complete the excavation to match (substantially match) a desired dimension(s) or other parameter(s). For example, the operator can perform or complete an excavation to match (substantially match) a desired width, length, height (depth), slope (grade), including side slope and/or longitudinal slope, profile, and/or elevation of the excavation.

Figure 28:
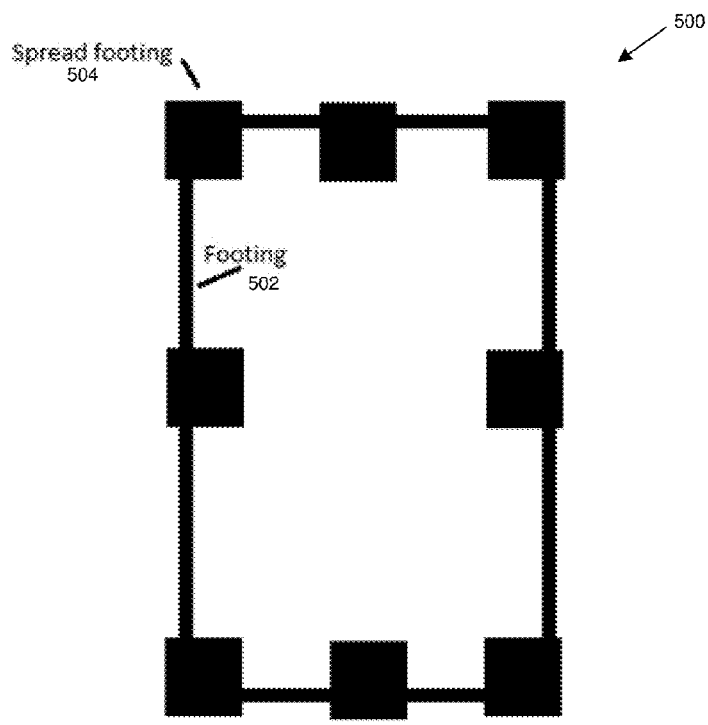
FIG. 28 illustrates an example use for the disclosed excavation measurement system and method.

One example of where the system and method disclosed herein may be implemented is when excavating footings in a building pad where earth formed footings are to be used. In one embodiment, as illustrated for example in FIG. 28, the footings, such as footings 500, may include a perimeter (or normal) footing, such as footing 502, and spread footings, such as spread footings 504, where the spread footings 504 may be excavated wider than the perimeter footing 502 (e.g., 10 feet for the spread footings vs. 3 feet for the perimeter footing) to accommodate the weight of building columns. As such, the system and method provides for measuring and communicating (e.g., to an operator of excavation or earthmoving equipment performing the excavating) information or data of the excavating, such as width, length, height (depth), slope (grade), including side slope and/or longitudinal slope, profile, and/or elevation (including changes or variations thereof) of the excavation for the footings.

Another example where the system and method disclosed herein may be implemented is during a pipe laying process for a pipe system, where the pipe system relies on a defined slope of an excavation for proper flow (e.g., water flow). As such, the system and method provides for measuring and communicating (e.g., to an operator of excavation or earthmoving equipment performing the excavating) information or data of the excavating, such as width, length, height (depth), slope (grade), including side slope and/or longitudinal slope, profile, and/or elevation (including changes or variations thereof) of the excavation for the pipe system.

The system and method disclosed herein may enable more precise, more efficient, and/or safer excavation. For example, the system and method may result in cost savings by reducing the amount of time to perform excavation and earth moving tasks (e.g., man hours, machine hours, project deadlines), may reduce waste (e.g., non-value-added work moving unnecessary amounts of material, extra costs accrued in materials used to fill an over-excavated excavation such as concrete, quarry stone, etc.), and/or may reduce the amount skill required to perform excavation and earth moving tasks. In addition, with the measurement data provided by the system and method, instances of an individual having to actually enter an excavation to perform measurement of the excavation by hand (e.g., during the excavation process) may be reduced or eliminated.

The system and method disclosed herein, including the laser sensor/scanner, may be used in conjunction with (or as part of a system with) other sensors or sensing technology (e.g., GPS, inclinometer, accelerometer, total station, and/or jobsite laser) to provide for recording and documenting information at a detailed level of topology. Such information may be represented graphically/topographically and/or may be geotagged, and may be sent remotely for review/interpretation.

While the examples presented illustrate measuring excavations that are rectangular or generally rectangular, it is understood, and within the scope of that disclosed, that the system and method presented may be used to measure excavations that are non-rectangular or generally non-rectangular.

While the examples presented illustrate the light shield or curtain of the laser field of view as being rectangular or generally rectangular, it is understood, and within the scope of that disclosed, that the light shield or curtain of the laser field of view can be configured, defined, or established to extend an exact or defined distance and/or cover a precise area including non-rectangular or generally non-rectangular areas.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An excavation measurement system, comprising:
    a sensor to be mounted on excavation equipment to establish a light curtain in an excavation area, the light curtain to measure a parameter of the excavation area; and
    an interface to communicate the measure of the parameter of the excavation area,
    in one position of the excavation equipment, the light curtain to measure a lateral profile of the excavation area and a longitudinal profile of the excavation area, and
    the interface including a display device to substantially simultaneously display a first image comprising the lateral profile of the excavation area and a second image comprising the longitudinal profile of the excavation area,
    the sensor comprising a first sensor to establish a first light curtain to measure the lateral profile of the excavation area and a second sensor to establish a second light curtain to measure the longitudinal profile of the excavation area.

2. The system of claim 1, the sensor to be positioned above the excavation area, and the light curtain to extend into the excavation area.

3. The system of claim 1, the light curtain to extend into the excavation area at an angle to horizontal.

4. The system of claim 1, the light curtain to extend a depth of the excavation area.

5. The system of claim 1, the excavation area including at least one of an area to be excavated by the excavation equipment and an area excavated by the excavation equipment.

6. The system of claim 1, the interface to communicate the measure of the parameter of the excavation area to an operator of the excavation equipment.

7. The system of claim 1, the interface to display the measure of the parameter of the excavation area.

8. The system of claim 1, the interface to display a desired parameter for the excavation area.

9. The system of claim 8, the interface to receive input of the desired parameter for the excavation area.

10. The system of claim 8, the interface to display the desired parameter for the excavation area in relation to at least one of an un-excavated cross-section of the excavation area, a partially excavated cross-section of the excavation area, and a completed cross-section of the excavation area.

11. The system of claim 8, the interface to provide an indication as to whether the desired parameter for the excavation area has been achieved.

12. The system of claim 1, the parameter of the excavation area including at least one of width, length, depth, slope, profile, and elevation of the excavation area.

13. The system of claim 1, the display of the longitudinal profile of the excavation area comprising a series of cross-sectional images representing different positions of measurement readings.

14. An excavation measurement system, comprising:
a sensor to be mounted on excavation equipment to establish a light curtain in an excavation area, the light curtain to measure a parameter of the excavation area; and
an interface to communicate the measure of the parameter of the excavation area,
in one position of the excavation equipment, the light curtain to measure a lateral profile of the excavation area and a longitudinal profile of the excavation area, and
the interface including a display device to substantially simultaneously display a first image comprising the lateral profile of the excavation area and a second image comprising the longitudinal profile of the excavation area,
in one position of the excavation equipment, the sensor to be rotated between a first position to establish a first light curtain to measure the lateral profile of the excavation area and a second position to establish a second light curtain to measure the longitudinal profile of the excavation area.

15. The system of claim 14, the sensor to be positioned above the excavation area, and the light curtain to extend into the excavation area.

16. The system of claim 14, the light curtain to extend into the excavation area at an angle to horizontal.

17. The system of claim 14, the light curtain to extend a depth of the excavation area.

18. The system of claim 14, the excavation area including at least one of an area to be excavated by the excavation equipment and an area excavated by the excavation equipment.

19. The system of claim 14, the interface to communicate the measure of the parameter of the excavation area to an operator of the excavation equipment.

20. The system of claim 14, the interface to display the measure of the parameter of the excavation area.

21. The system of claim 14, the interface to display a desired parameter for the excavation area.

22. The system of claim 21, the interface to receive input of the desired parameter for the excavation area.

23. The system of claim 21, the interface to display the desired parameter for the excavation area in relation to at least one of an un-excavated cross-section of the excavation area, a partially excavated cross-section of the excavation area, and a completed cross-section of the excavation area.

24. The system of claim 21, the interface to provide an indication as to whether the desired parameter for the excavation area has been achieved.

25. The system of claim 14, the parameter of the excavation area including at least one of width, length, depth, slope, profile, and elevation of the excavation area.

26. The system of claim 14, the display of the longitudinal profile of the excavation area comprising a series of cross-sectional images representing different positions of measurement readings.

27. An excavation measurement method, comprising:
measuring a parameter of an excavation area with a sensor mounted on excavation equipment, including establishing a light curtain with the sensor and measuring the parameter with the light curtain; and
communicating the measure of the parameter of the excavation area,
wherein measuring the parameter of the excavation area includes, in one position of the excavation equipment, measuring a lateral profile of the excavation area and a longitudinal profile of the excavation area, and
wherein communicating the measure of the parameter of the excavation area includes substantially simultaneously displaying a first image comprising the lateral profile of the excavation area and a second image comprising the longitudinal profile of the excavation area,
wherein the sensor comprises a first sensor and a second sensor, and wherein measuring the parameter of the excavation area includes establishing a first light curtain with the first sensor and measuring the lateral profile with the first light curtain, and establishing a second light curtain with the second sensor and measuring the longitudinal profile with the second light curtain.

28. The method of claim 27, wherein measuring the parameter of the excavation area includes positioning the sensor above the excavation area, and extending the light curtain into the excavation area to a depth of the excavation area.

29. The method of claim 27, wherein communicating the measure of the parameter of the excavation area includes communicating the measure of the parameter of the excavation area to an operator of the excavation equipment.

30. The method of claim 27, wherein communicating the measure of the parameter of the excavation area includes displaying the measure of the parameter of the excavation area.

31. The method of claim 27, further comprising:
receiving input of a desired parameter for the excavation area.

32. The method of claim 31, wherein communicating the measure of the parameter of the excavation area includes displaying the desired parameter for the excavation area in relation to the excavation area.

33. The method of claim 31, wherein communicating the measure of the parameter of the excavation area includes providing an indication as to whether the desired parameter for the excavation area has been achieved.

34. The method of claim 27, wherein the parameter of the excavation area includes at least one of width, length, depth, slope, profile, and elevation of the excavation area.

35. The method of claim 27, wherein displaying the longitudinal profile of the excavation area comprises displaying a series of cross-sectional images representing different positions of measurement readings.

36. An excavation measurement method, comprising:
   measuring a parameter of an excavation area with a sensor mounted on excavation equipment, including establishing a light curtain with the sensor and measuring the parameter with the light curtain; and
   communicating the measure of the parameter of the excavation area,
   wherein measuring the parameter of the excavation area includes, in one position of the excavation equipment, measuring a lateral profile of the excavation area and a longitudinal profile of the excavation area, and
   wherein communicating the measure of the parameter of the excavation area includes substantially simultaneously displaying a first image comprising the lateral profile of the excavation area and a second image comprising the longitudinal profile of the excavation area,
   wherein measuring the parameter of the excavation area includes, in one position of the excavation equipment, rotating the sensor between a first position and a second position, and establishing a first light curtain with the sensor in the first position and measuring the lateral profile with the first light curtain and establishing a second light curtain with the sensor in the second position and measuring the longitudinal profile with the second light curtain.

37. The method of claim 36, wherein measuring the parameter of the excavation area includes positioning the sensor above the excavation area, and extending the light curtain into the excavation area to a depth of the excavation area.

38. The method of claim 36, wherein communicating the measure of the parameter of the excavation area includes communicating the measure of the parameter of the excavation area to an operator of the excavation equipment.

39. The method of claim 36, wherein communicating the measure of the parameter of the excavation area includes displaying the measure of the parameter of the excavation area.

40. The method of claim 36, further comprising:
   receiving input of a desired parameter for the excavation area.

41. The method of claim 40, wherein communicating the measure of the parameter of the excavation area includes displaying the desired parameter for the excavation area in relation to the excavation area.

42. The method of claim 40, wherein communicating the measure of the parameter of the excavation area includes providing an indication as to whether the desired parameter for the excavation area has been achieved.

43. The method of claim 36, wherein the parameter of the excavation area includes at least one of width, length, depth, slope, profile, and elevation of the excavation area.

44. The method of claim 36, wherein displaying the longitudinal profile of the excavation area comprises displaying a series of cross-sectional images representing different positions of measurement readings.

* * * * *